United States Patent [19]

Buell

[11] 4,051,321

[45] Sept. 27, 1977

[54] DUAL SPRING CLIP FOR MOUNTING ELECTRICAL DEVICES

[76] Inventor: Donald D. Buell, 3040 Harris Road, Kelso, Wash. 98626

[21] Appl. No.: 614,422

[22] Filed: Sept. 18, 1975

[51] Int. Cl.$^2$ .............................................. H02G 3/08
[52] U.S. Cl. .................................................... 174/57
[58] Field of Search ................ 174/53, 51, 57; 220/3, 220/7; 267/164, 165, 166, 180, 110; 24/81 F, 73 B, 261 D, 261 F, 261 PC, 259 R

[56] References Cited

U.S. PATENT DOCUMENTS

| 245,447 | 8/1881 | Chittenden | 267/165 X |
|---|---|---|---|
| 772,036 | 10/1904 | Haggard | 24/261 D |
| 1,433,201 | 10/1922 | Grant | 267/165 X |
| 1,654,076 | 12/1927 | Griffiths | 24/261 F |
| 1,893,098 | 1/1933 | Murray et al. | 267/165 X |
| 2,056,139 | 9/1936 | Kelly | 24/261 F |
| 3,309,075 | 3/1967 | Slominski | 267/110 |
| 3,697,924 | 10/1972 | Oliver | 174/51 |
| D. 25,926 | 8/1896 | Elliston | 24/261 D |

FOREIGN PATENT DOCUMENTS

| 1,189,061 | 9/1959 | France | 428/3 |

Primary Examiner—Bruce A. Reynolds
Assistant Examiner—D. A. Tone
Attorney, Agent, or Firm—William B. Walter

[57] ABSTRACT

A spring clip having two parallel coils joined by an integral member at right angles to the coils is used to provide a stepped attachment of electrical switches, receptacles, and such devices in electrical outlet boxes such that the switches etc. may be readily set for depth and a sidewise position in the box so as to be plumb to meet a variety of box installation problems.

4 Claims, 12 Drawing Figures

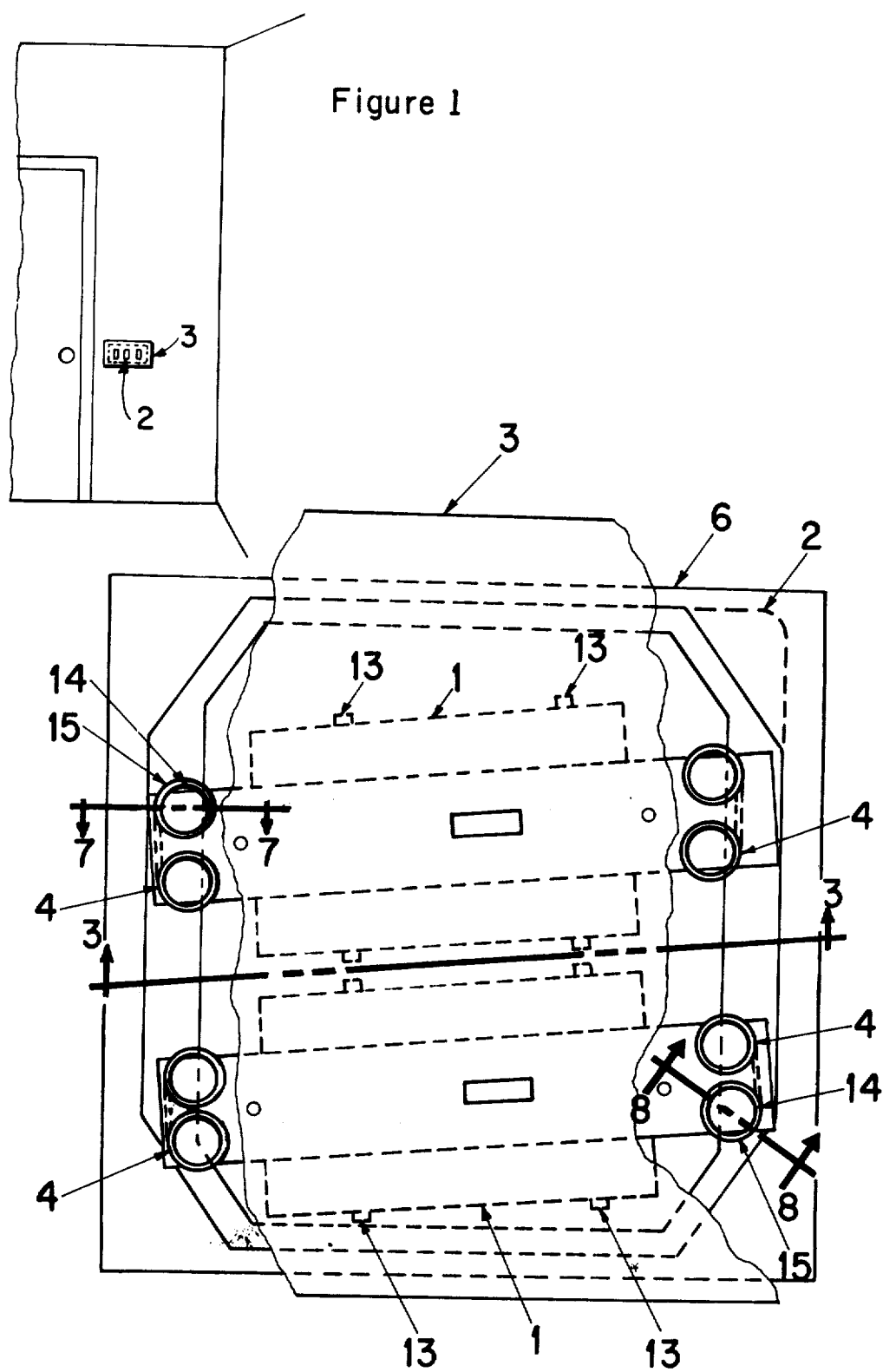

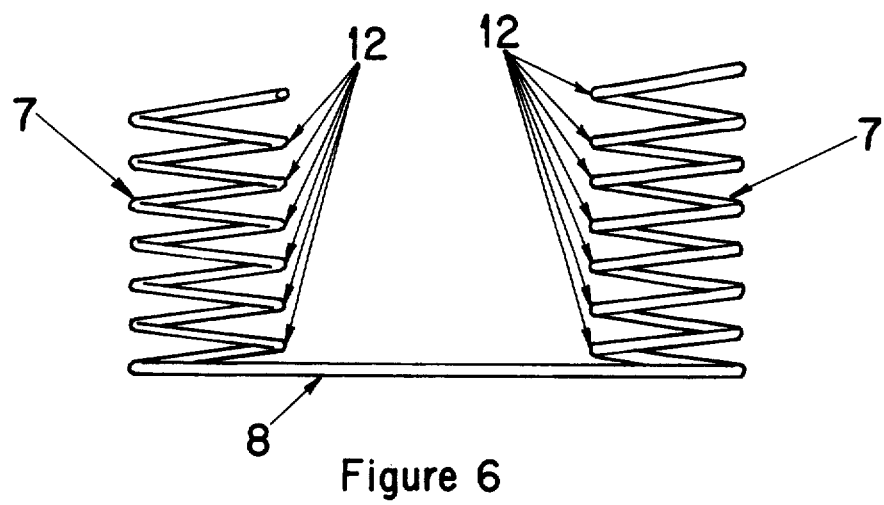
Figure 6
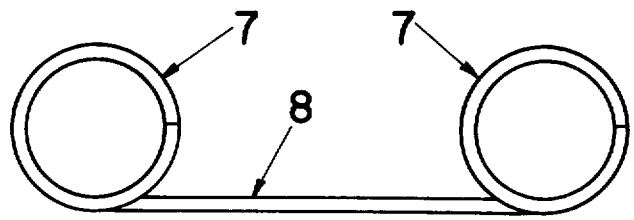
Figure 5
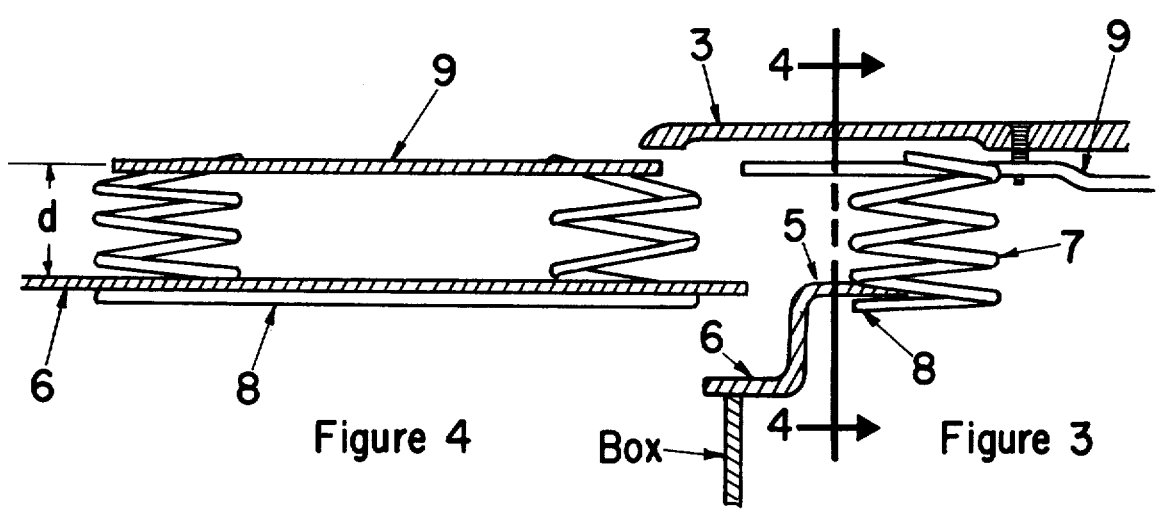
Figure 4    Box    Figure 3

DUAL SPRING CLIP FOR MOUNTING ELECTRICAL DEVICES

BACKGROUND

In mounting switches, receptacles, and other devices -hereinafter termed electrical devices in the specification and claims- in electrical boxes the electrician often encounters trouble in that either the tapped holes in the outlet box or plaster ring attached to the outlet box are damaged or filled with plaster, or the box is not plumb making it impossible to mount the switch and cover plate plumb within the tolerances allowed by the slotted mounting holes. At times other tradesmen have bent the box out of shape and then grouted it into place in that condition.

The electrician must therefore often clean the threaded holes with a tap, or remove plaster and concrete to replace or realign the box, replastering or grouting, and then install the electrical device and cover plate. The problem is particularly acute where several electrical devices are gang mounted in parallel in one box since in this case not only must each unit be plumb, but all must be in line horizontally. As in other like problems, the cost of building is greatly increased by the retrofit work described above.

In the prior art as seen in U.S. Pat. Nos. 1,933,358 to Almcrantz, 1,345,503 to Newton, 920,408 to Scism, and 1,964,535 to Schrieber either the device, or the outlet box, or both must be modified from present standards to accomplish an attachment of the device to the outlet box at a variable depth within the box. There has been no means for the electrician to install electrical devices in canted positions in relation to the box so as to allow a plumb installation of the devices and cover plates where the box is not plumb or is bent out of shape.

BRIEF SUMMARY OF THE INVENTION

The object of this invention is to provide an alternate means to install electrical devices such as switches and receptacles in electrical outlet boxes when because of damage to the box, to the mounting screwholes, and/or misalignment of the box as installed, repair or replacement and reinstallation of the box would be required.

Another object of this invention is to provide such an installation means which will fit standard electrical devices and the boxes into which they are ordinarily installed without modification of box or device.

It is another object of this invention to provide such an installation means that is inexpensive and easy to install without special tools.

The invention is the use of a dual spring clip in place of the mounting screws normally securing each end of the electrical device to the outlet box. The dual spring clip of this invention is a pair of springs held in parallel spaced relationship by an integral member at one end of the springs. The springs are helical or an alternately folded member providing a series of stepped attachment points. The mounting lip of the box or of a plaster ring attached to the box forced in between the member joining the two springs and the springs themselves fastens the dual spring clip to the box. The position of the clip on the mounting lip of the box may be adjusted by sliding the clip along the lip. The two springs provide two parallel columns to grip and support the mounting ear of the device at any one of a number of stepped positions.

BRIEF DESCRIPTION OF THE DRAWINGS

In the drawings,

FIG. 1 shows a typical multiple switch installation in a wall wherein the outlet box is out of plumb, yet the switches and cover plate may be installed by use of the dual spring clip of this invention.

FIG. 2 is an enlarged view of the outlet box of FIG. 1 with two switches installed and portions of the cover plate broken away for clarity.

FIG. 3 is a sectional view of the installation of FIG. 2 on the line 3—3, and FIG. 4 is a sectional view taken on the line 4—4 of FIG. 3.

FIG. 5 is a plan view of the dual spring clip shown in FIG. 2, and FIG. 6 is an elevation of the clip of FIG. 5.

FIG. 10 shows a plan view of the spring clip of FIG. 9, while

DETAILED DESCRIPTION OF THE INVENTION

Figure 9:
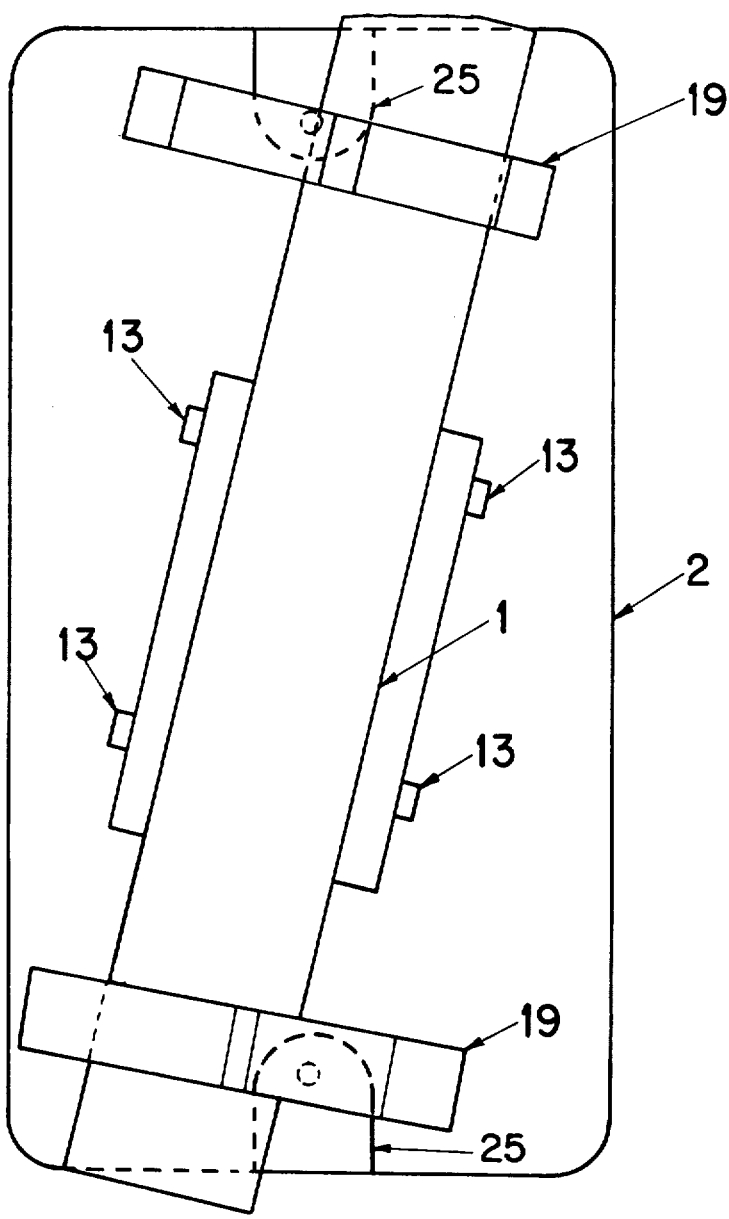
FIG. 9 shows a device installed in a single box with another version of the dual spring clip.

Referring to the drawings, FIG. 1 illustrates one aspect of the problem faced by the electrician upon installation of electrical devices 1 in an outlet box 2 which is not plumb. The outlet box 2 is often installed in a wall and plastered into place in such out-of-plumb positions and to such an extent that the slotted holes in the mounting ears 9 of the electrical devices 1 will not allow a plumb installation of the electrical devices 1 and the cover plates 3 fastened to the electrical devices 1. In the closeup view of the assembly as shown in FIG. 2, it can be seen that the two electrical devices 1 are installed at an angle to the box 2 which is out of plumb. The positions of the two devices in relation to each other are dictated by their attachment to the cover plate 3.

In the illustration of FIG. 2 and the sectional views FIGS. 3 and 4, the outlet box 2 is shown with a metal plaster ring 6 attached to the open face of the box 2. Plaster rings 6 are commonly used with outlet boxes installed on a wall to be plastered so that the plaster can be trowled flush with the box. In this installation the dual spring clip 4 is attached to the box 2 by forcing it against the lip 5 of the plaster ring 6 so that the integral member 8 joining the two springs 7 is under the lip 5 and the two coil springs 7 are on top of the lip 5 as two supporting columns for the electrical device 1. A firm attachment of the clip 4 to the box 2 is obtained because of the stiffness of the coils 7 and the interference fit of the lip 5 between the coils 7 and the connecting member 8. The two spring clips 4 used to attach one device 1 to the box 2 are so positioned along the opposite lips of the plaster ring 6 as to set the device 1 in a plumb position.

In a conventional installation of an electrical device, the device 1 is placed in the box with the mounting ears 9 of the device spanning the opening of the box 2 and resting against the wall surface. The ears are then fastened to the box 2 by mounting screws inserted through holes in the ears 9 and threaded into holes in the lip 5 of the plaster ring, with the screws tightened to hold the ears 9 firmly against the wall. When using the dual spring clips 4 of this invention to make a similar installation, the electrician forces the mounting ears 9 of device 1 between turns, at the distance d, of the two springs 7 at each end of the device 1 so as to draw the outer ends of the ears 9 against the wall surface 10 as seen in FIGS. 3 and 4. In the clip design, the coil spacing and the coil diameter are selected to accommodate the mounting ears 9 of standard electrical device which ears 9 are ⅝ to ¾ inch (16 to 19 mm.S.I.) at the mounting hole area. The lead distance between turns of the springs 7 is selected for a tight interference fit with the ears 9 which are about 1/32 inch (0.8mm.S.I.) thick. Preferably the springs 7 are so constructed that a notch 12 is provided in each turn to allow the electrician to break off the surplus turns so that they will not interfere with installation of the cover plate 3 as seen in FIG. 3. The cover plates 3 are sufficiently recessed on the underside to allow for the thickness of one turn. In the absence of breakoff points 12 on the springs the electrician can cut off the excess turns with his wire cutters.

The dual spring clip 4 thus provides a structural attachment of electrical devices 1 to outlet boxes 2 so as to allow for misalignment. In addition the clip 4 provides a low resistance electrical grounding contact through the clip 4 between the electrical device 1 and the box 2. This contact can be improved by corrosion prevention plating of the spring steel coils 7 with copper, cadmium, aluminum, zinc, or other metal and also by use of a surface roughness on the coils to bite into the surface of the mounting ears 9, and the lip 5 of the box or plaster ring 6.

The wire for the dual coil spring clip 4 can be any of a variety of cross-sections. Examples are the following: circular, sqaure, flat, diamond, twisted diamond, grooved, or ribbed. The last four varieties could improve the ability of the coil turns to obtain good electrical contact with the lip 5 and the ear 9.

It will be noted in FIGS. 5 and 6 that the dual coil spring clip 4 is made from a single piece of wire having a left hand helical coil 7 on the left, a joining member 8 connecting the two coils 7, and a right hand helical coil on the right. It is also possible to achieve the same function with a coil construction in which both coils are wound in the same direction.

Figure 7:
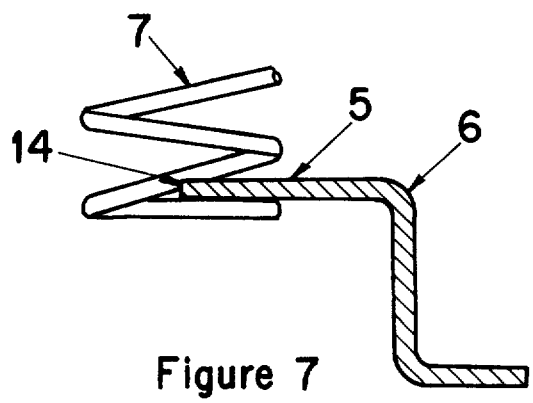
FIGS. 7 and 8 are partial sections on the lines 7—7 and 8—8 of FIG. 2 respectively.
Figure 8:
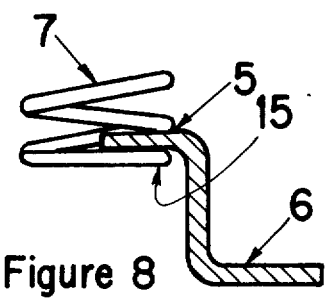

In the use of the spring clip 4 of this invention it is necessary to limit the amount of angularity and sidewise displacement of the devices 1 within the box 2 from the usual centered position since many devices 1 have bare connections 13 on their sides. Thus without a means to limit displacement from center a device 1 could be so turned or moved sidewise that the bare connections 13 could touch the inside wall of the box 2 causing an electrical short. In the installation of FIG. 2, the devices 1 have been rotated in a counter-clockwise direction within the box 2 and displaced to the right as far as contact of the inside of coils 7 at points 14 with the lip 5 of the plaster ring 6 will allow as shown in detail in FIG. 7. The outside surface of the coils at points 15 with the plaster ring 6 also limit further displacement as seen in FIG. 8.

However, the spring clips of my invention are designed to hold the devices 1 to the plaster ring 6 or to the mounting tabs 25 of the box 2 so firmly that if any force within reason is applied to the exposed portion of the device 1 or to the cover plate 3, the device 1 will not be moved in relation to the box 2.

Figure 10:
Figure 11:
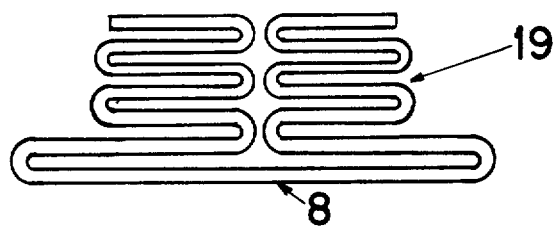
FIG. 11 is an elevation of the spring clip of FIGS. 9 and 10.
Figure 12:
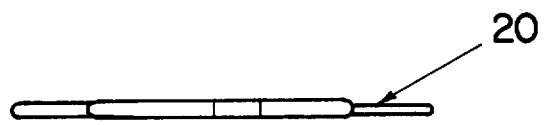
FIG. 12 illustrates a spring clip similar to that of FIGS. 9 through 11 in plan view. The clip of FIG. 12 is made of wire.

The helix is one form of sinuous structure which will provide a flexible spring with stepped engagement points for mounting electrical devices in the manner of this invention. Another form of spring is shown in the dual spring clips 19 of FIGS. 9 through 11 where a flat ribbon of metallic spring stock is folded alternately into a sinuous form. Such a spring clip construction provides greater contact area for gripping and for electrical contact. Surface roughness may be provided as in the wire coils to bite into contacting surfaces. The alternately folded spring clip construction may also be accomplished with a length of wire 20 as in FIG. 12.

The dual spring clips of this invention as shown in varying forms and installations thus meet the objectives of this invention wherein neither the devices nor the boxes need be modified, yet the devices may be installed at a greater angular displacement without the use of the mounting screws and at a variety of steps to accommodate installation at various depths within the boxes. All this is accomplished with spring clips which need not be expensive nor require special tools to install.

I claim:

1. In an electrical outlet assembly the combination of the following:
   a. an outlet box having an open end and mounting lips projecting partially across the open end of the box,
   b. an electrical device having a mounting ear on each end thereof for attachment to an outlet box, and
   c. a dual spring clip securing a mounting ear of the electrical device to a mounting lip of the box, said dual spring clip comprising two parallel springs, each of which is in clamping engagement with a mounting ear of the electrical device and a member joining the two springs and serving to clamp the dual spring clip to the box.

2. An electrical outlet assembly as claimed in claim 1 also comprising a cover plate attached to the electrical device.

3. In an electrical outlet assembly, the combination of the following:
   a. an outlet box having an open end and a plaster ring attached to the open end of the outlet box said plaster ring having an electrical device support lip extending partially across the open end of the box,
   b. an electrical device having a mounting ear on each end thereof for attachment to an outlet box, and
   c. a dual spring clip securing a mounting ear of the electrical device to a mounting lip of the plaster ring, said dual spring clip comprising two parallel springs, each of which is in clamping engagement with a mounting ear of the electrical device and a member joining the two springs and serving to clamp the dual spring clip to the mounting lip of the plaster ring.

4. An electrical outlet assembly as claimed in claim 3 also comprising a cover plate attached to the electrical device.

* * * * *